United States Patent
Ito et al.

(10) Patent No.: US 11,979,053 B2
(45) Date of Patent: May 7, 2024

(54) SYSTEM, VEHICLE, DISCHARGE METHOD, AND PROGRAM

(71) Applicant: MITSUBISHI HEAVY INDUSTRIES THERMAL SYSTEMS, LTD., Tokyo (JP)

(72) Inventors: Masato Ito, Tokyo (JP); Shota Okubo, Tokyo (JP); Hiroto Higuchi, Tokyo (JP); Goki Murase, Tokyo (JP)

(73) Assignee: MITSUBISHI HEAVY INDUSTRIES THERMAL SYSTEMS, LTD., Tokyo (JP)

(*) Notice: Subject to any disclaimer, the term of this patent is extended or adjusted under 35 U.S.C. 154(b) by 71 days.

(21) Appl. No.: 17/915,066

(22) PCT Filed: Apr. 1, 2021

(86) PCT No.: PCT/JP2021/014169
§ 371 (c)(1),
(2) Date: Sep. 27, 2022

(87) PCT Pub. No.: WO2021/201230
PCT Pub. Date: Oct. 7, 2021

(65) Prior Publication Data
US 2023/0147382 A1    May 11, 2023

(30) Foreign Application Priority Data
Apr. 3, 2020  (JP) .................................. 2020-067615

(51) Int. Cl.
*H02J 7/34* (2006.01)
*B60L 58/10* (2019.01)
(Continued)

(52) U.S. Cl.
CPC ............ *H02J 7/345* (2013.01); *H02J 7/0063* (2013.01); *H02M 1/08* (2013.01); *H02M 7/5387* (2013.01);
(Continued)

(58) Field of Classification Search
CPC ...... H02J 7/345; H02J 7/0063; H02J 2207/20; H02M 1/08; H02M 7/5387; H02P 27/06; B60L 58/10
See application file for complete search history.

(56) References Cited

U.S. PATENT DOCUMENTS

2016/0107635 A1* 4/2016 Kodawara ................. B60L 7/14
                                                            180/65.265
2016/0303948 A1* 10/2016 Sakai ..................... B60L 15/007
(Continued)

FOREIGN PATENT DOCUMENTS

JP         2015-100241 A     5/2015

OTHER PUBLICATIONS

International Search Report and Written Opinion of the International Searching Authority for International Application No. PCT/JP2021/014169, dated Jun. 8, 2021, with English translation.

*Primary Examiner* — Jared Fureman
*Assistant Examiner* — Duc M Pham
(74) *Attorney, Agent, or Firm* — Birch, Stewart, Kolasch & Birch, LLP (57) ABSTRACT

A system according to the present invention comprises: a power source which generates a first low voltage from a supplied high voltage; a capacitor which suppresses fluctuations in the high voltage; and a first device which operates by using the first low voltage as an electric power source and which increases its own current consumption when supply of the high voltage to the power source has stopped.

10 Claims, 4 Drawing Sheets

(51) Int. Cl.
*H02J 7/00* (2006.01)
*H02M 1/08* (2006.01)
*H02M 7/5387* (2007.01)
*H02P 27/06* (2006.01)

(52) U.S. Cl.
CPC .............. *H02P 27/06* (2013.01); *B60L 58/10* (2019.02); *H02J 2207/20* (2020.01)

(56) References Cited

U.S. PATENT DOCUMENTS

2017/0210240 A1* 7/2017 Unno ...................... B60L 50/51
2017/0305274 A1* 10/2017 Saha ........................ B60L 3/003
2019/0334469 A1* 10/2019 Hara ....................... H02P 27/08

* cited by examiner

SYSTEM, VEHICLE, DISCHARGE METHOD, AND PROGRAM

TECHNICAL FIELD

The present disclosure relates to a system, a vehicle, a discharge method, and a program.

The present application claims priority based on Japanese Patent Application No. 2020-067615 filed in Japan on Apr. 3, 2020, the contents of which are incorporated herein by reference.

BACKGROUND ART

A vehicle such as a hybrid electric vehicle is equipped with a battery that outputs a high voltage as an electric power source used for making the vehicle travel. In such a vehicle, a low voltage used in the vehicle may be generated from a high voltage output by the battery using a DC-DC converter power source.

PTL 1 discloses as a related technique an in-vehicle electric system that discharges electric charges from a smoothing capacitor when an abnormal situation occurs.

CITATION LIST

Patent Literature

[PTL 1] Japanese Unexamined Patent Application Publication No. 2015-100241

SUMMARY OF INVENTION

Technical Problem

However, it is not desirable to come into contact with the smoothing capacitor when a high voltage electric charge is accumulated in the smoothing capacitor and a discharge passage of the electric charge has disappeared. Therefore, when the high voltage electric charge is accumulated in the smoothing capacitor and the discharge passage of the electric charge has disappeared, there is a demand for a technique capable of quickly discharging the electric charge, similar to the invention described in PTL 1.

The present disclosure aims to provide a system, a vehicle, a discharge method, and a program capable of solving the above problems.

Solution to Problem

In order to solve the above problems, a system according to the present disclosure includes: a power source that generates a first low voltage from a supplied high voltage; a capacitor that suppresses a fluctuation in the high voltage; and a first device that operates by using the first low voltage as an electric power source and that increases current consumption of the first device when supply of the high voltage to the power source is stopped.

A vehicle according to the present disclosure includes: the above-described system; a battery that outputs the high voltage; and a determination device that determines whether or not the supply of the high voltage to the power source is stopped, in which the first device increases the current consumption of the first device when the determination device determines that the supply of the high voltage to the power source is stopped.

A discharge method according to the present disclosure includes: causing a power source to generate a first low voltage from a supplied high voltage; causing a capacitor to suppress a fluctuation in the high voltage; and causing a first device to operate by using the first low voltage as an electric power source and to increase current consumption of the first device when supply of the high voltage to the power source is stopped.

A program according to the present disclosure for causing a computer of a system including a power source that generates a first low voltage from a supplied high voltage, a capacitor that suppresses fluctuations in the high voltage, and a first device that operates by using the first low voltage as an electric power source, to execute: increasing current consumption of the first device when supply of the high voltage to the power source is stopped.

Advantageous Effects of Invention

According to a system, a vehicle, a discharge method, and a program of an embodiment of the present disclosure, when a high voltage electric charge is accumulated in a capacitor and a discharge passage of the electric charge has disappeared, it is possible to quickly discharge the electric charge.

DESCRIPTION OF EMBODIMENTS

Embodiments

Hereinafter, embodiments will be described in detail with reference to the drawings.

(Configuration of Vehicle)

A vehicle 1 according to one embodiment of the present disclosure will be described.

Figure 1:
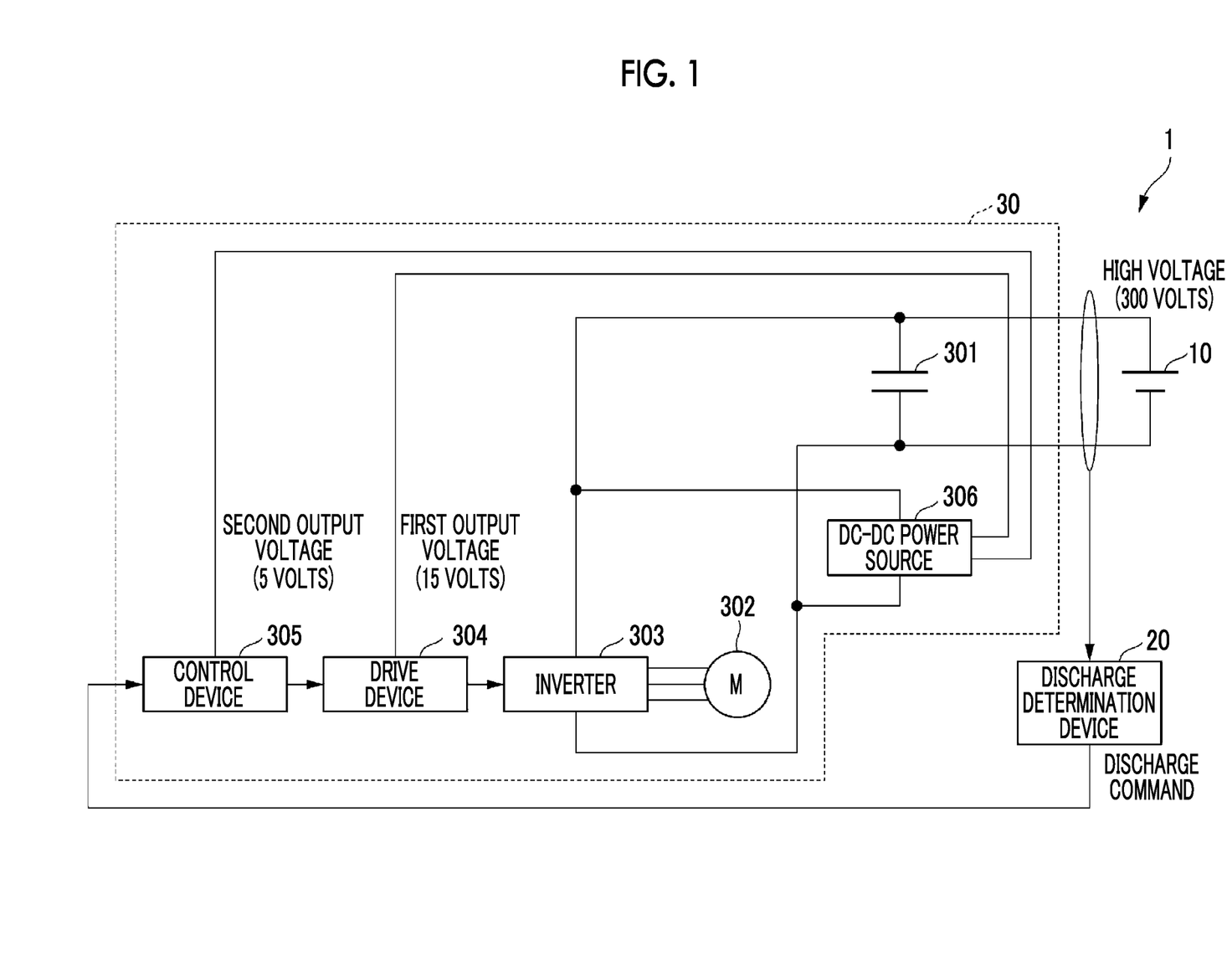
FIG. 1 is a diagram showing one example of a configuration of a vehicle according to an embodiment of the present disclosure.

The vehicle 1 is a hybrid electric vehicle or the like. As shown in FIG. 1, the vehicle 1 includes a battery 10, a discharge determination device 20, and an in-vehicle air conditioning system 30.

The battery 10 is a battery that outputs a high voltage used for making the vehicle 1 travel. The output voltage of the battery 10 is supplied to the in-vehicle air conditioning system 30. The output voltage of the battery 10 is, for example, 300 volts.

The discharge determination device 20 is a device that determines whether or not to output a discharge command to the in-vehicle air conditioning system 30 based on a state of the vehicle 1.

For example, when the discharge determination device 20 determines that the vehicle 1 collided with an object, the discharge determination device 20 determines that the discharge command is output. Further, when the discharge determination device 20 determines that the vehicle 1 did not collide with the object, the discharge determination device 20 determines that the discharge command is not output.

Further, for example, when the discharge determination device 20 determines that a wiring between the battery 10 and the in-vehicle air conditioning system 30 is broken, the discharge determination device 20 determines that the discharge command is output. Further, when the discharge determination device 20 determines that a wiring between the battery 10 and the in-vehicle air conditioning system 30 is not broken, the discharge determination device 20 determines that the discharge command is not output.

When the discharge determination device 20 determines that the discharge command is output, the discharge determination device 20 outputs the discharge command to the in-vehicle air conditioning system 30. Further, when the discharge determination device 20 determines that the discharge command is not output, the discharge determination device 20 does not output the discharge command to the in-vehicle air conditioning system 30.

The in-vehicle air conditioning system 30 is a system that generates a low voltage from the high voltage output from the battery 10. As shown in FIG. 1, the in-vehicle air conditioning system 30 includes a smoothing capacitor 301, a motor 302, an inverter 303, a drive device 304, a control device 305, and a DC-DC power source 306.

The smoothing capacitor 301 is a capacitor provided between a terminal of the battery 10 on a low voltage side and a terminal of the battery 10 on a high voltage side in order to suppress fluctuations in the output voltage of the battery 10. When the battery 10 is connected to the smoothing capacitor 301, the smoothing capacitor 301 is charged by the battery 10.

The motor 302 is a motor used for an air conditioner in the vehicle 1. The motor 302 operates according to a voltage received from the inverter 303. The motor 302 is, for example, a compressor motor.

The inverter 303 is an inverter that operates at the high voltage output from the battery 10. The inverter 303 drives the motor 302 according to a voltage received from the drive device 304.

The drive device 304 is a device that operates at a first output voltage generated by the DC-DC power source 306. The drive device 304 generates the voltage based on a voltage received from the control device 305. The drive device 304 outputs the generated voltage to the inverter 303. The drive device 304 is, for example, a driver integrated circuit (IC).

The control device 305 is a device that operates at a second output voltage generated by the DC-DC power source 306.

The control device 305 generates the voltage for operating the motor 302 before receiving the discharge command from the discharge determination device 20. The control device 305 outputs the generated voltage to the drive device 304.

Further, when the control device 305 receives the discharge command from the discharge determination device 20, the control device 305 increases current consumption of the control device 305 and outputs the voltage, which is used for increasing current consumption of the drive device 304, to the drive device 304.

Examples of a method of increasing the current consumption of the control device 305 include increasing a clock frequency when the control device 305 is a central processing unit (CPU), preparing a program for performing repetitive calculations in advance, executing the repetitive calculations when the discharge command is received, and the like.

Further, examples of a method of increasing the current consumption of the drive device 304 include outputting the voltage used for switching an insulated gate bipolar transistor (IGBT) at a high speed to the drive device 304 via the control device 305 when the drive device 304 is a driver IC configured with an IGBT, and the like.

Figure 2:
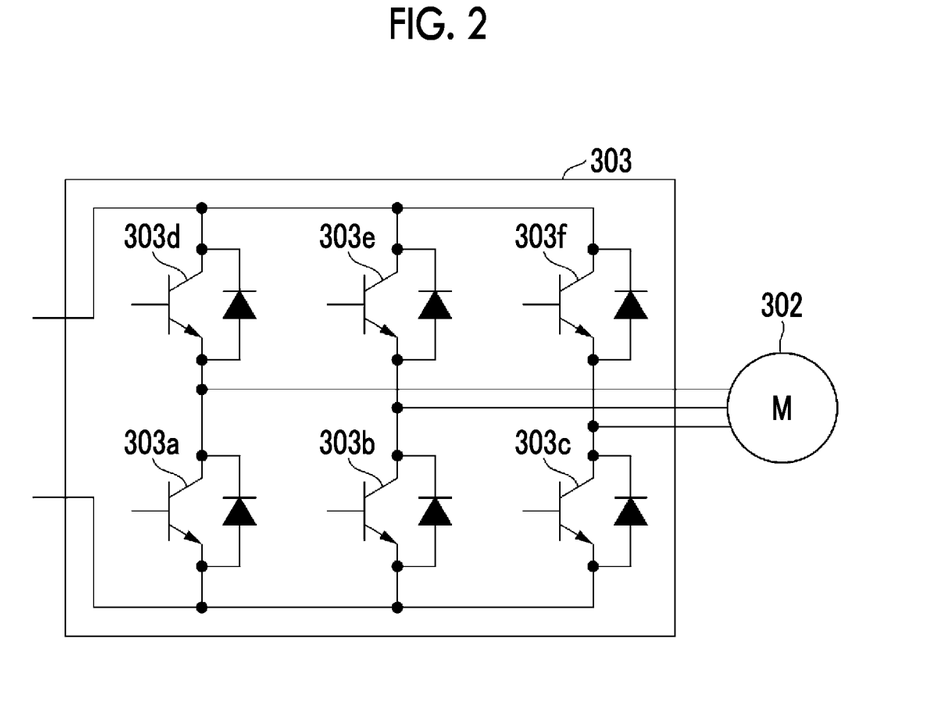
FIG. 2 is a diagram showing one example of a configuration of an inverter according to the embodiment of the present disclosure.

For example, as shown in FIG. 2, when the inverter 303 includes switching elements 303a, 303b, 303c, 303d, 303e, and 303f, the control device 305 may switch only the IGBT that is related to the control of the switching elements 303a, 303b, and 303c provided on the low voltage side of the switching elements 303a to 303f at a high speed and may fix the switching elements 303d, 303e, and 303f in an OFF state regarding the IGBT that is related to the control of the switching elements 303d, 303e, and 303f. Alternatively, the control device 305 may switch only the IGBT that is related to the control of the switching elements 303d, 303e, and 303f provided on the high voltage side of the switching elements 303a to 303f at a high speed and may fix the switching elements 303a, 303b, and 303c in the OFF state regarding the IGBT that is related to the control of the switching elements 303a, 303b, and 303c.

As described above, when the current consumption of the control device 305 or the current consumption of the drive device 304 increases, the output current of the DC-DC power source 306 increases. Therefore, the current that flows from the smoothing capacitor 301 to the DC-DC power source 306 increases. That is, when a discharge command is received from the discharge determination device 20, the in-vehicle air conditioning system 30 can discharge the electric charge, which is charged in the smoothing capacitor 301, at a high speed by increasing the current consumption of the control device 305 or the current consumption of the drive device 304.

The DC-DC power source 306 is a power source that generates a first output voltage and a second output voltage from the high voltage output from the battery 10. For example, the first output voltage is 15 volts. Further, the second output voltage is 5 volts.

Next, the process of the vehicle 1 according to one embodiment of the present disclosure will be described.

Figure 3:
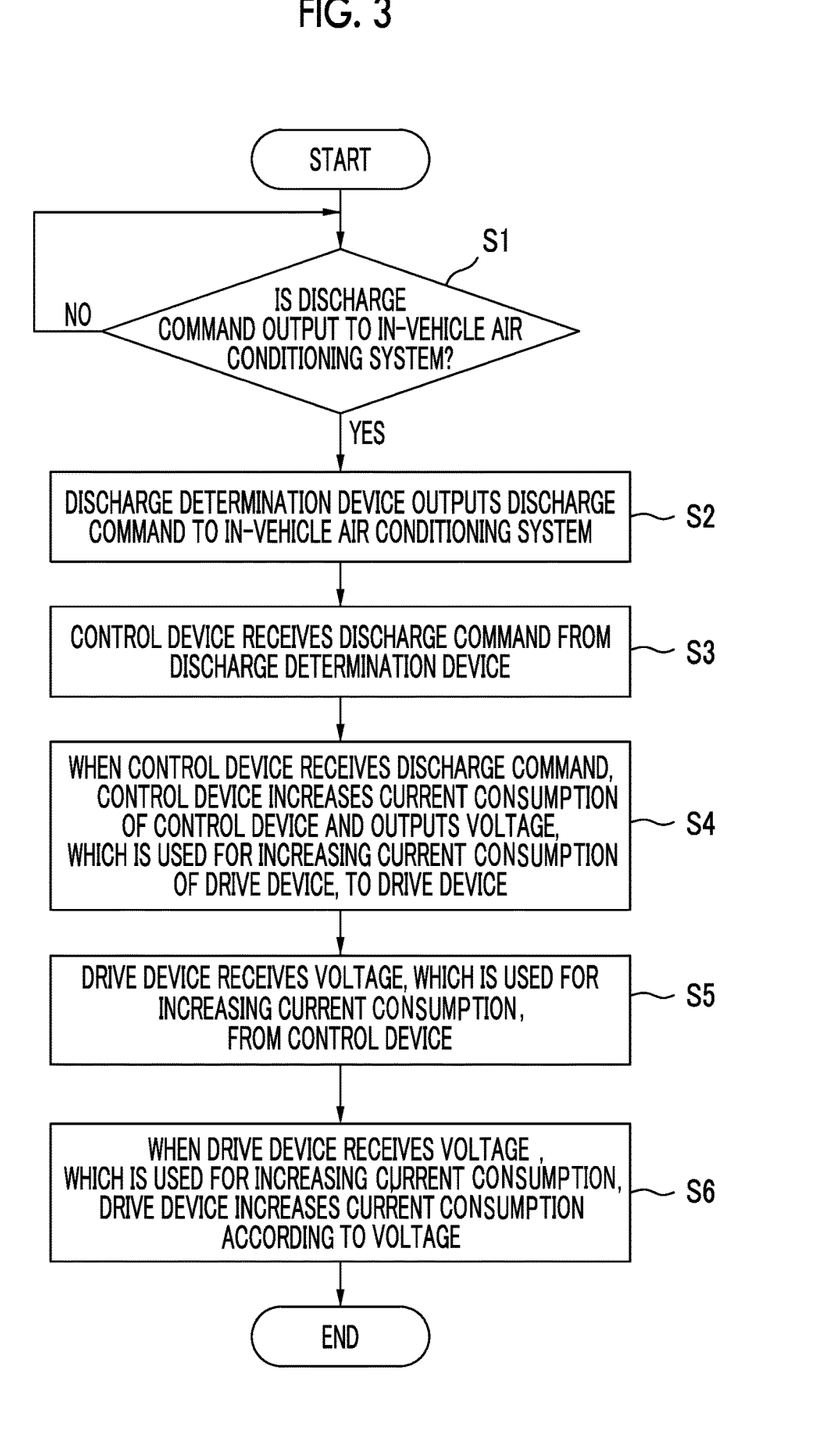
FIG. 3 is a diagram showing a flow of a process of the vehicle according to one embodiment of the present disclosure.

The flow of the process of the vehicle 1 shown in FIG. 3 will be described.

The discharge determination device 20 determines whether or not to output the discharge command to the in-vehicle air conditioning system 30 based on a state of the vehicle 1 (step S1).

When the discharge determination device 20 determines that the discharge command is not output (NO in step S1), the discharge determination device 20 returns the process to step S1 without outputting the discharge command.

Further, when the discharge determination device 20 determines that the discharge command is output (YES in step S1), the discharge determination device 20 outputs the discharge command to the in-vehicle air conditioning system 30 (step S2).

The control device 305 receives the discharge command from the discharge determination device 20 (step S3). When the control device 305 receives the discharge command, the control device 305 increases current consumption of the control device 305 and outputs the voltage, which is used for increasing current consumption of the drive device 304, to the drive device 304 (step S4).

As the current consumption of the control device 305 increases, the current that flows from the DC-DC power source 306 to the control device 305 increases.

The drive device 304 receives the voltage, which is used for increasing the current consumption, from the control device 305 (step S5). When the drive device 304 receives the voltage, which is used for increasing the current consumption, the drive device 304 increases the current consumption according to the voltage (step S6).

As the current consumption of the drive device 304 increases, the current that flows from the DC-DC power source 306 to the drive device 304 increases.

The above process is a process based on an electric signal, and the process is performed at a high speed. Therefore, the process of step S4 and the process of step S6 are processed substantially at the same time. That is, the current consumption of the control device 305 and the current consumption of the drive device 304 increase substantially at the same time.

The vehicle 1 according to one embodiment of the present disclosure has been described above.

In the in-vehicle air conditioning system 30 of the vehicle 1 according to one embodiment of the present disclosure, the DC-DC power source 306 (an example of a power source) generates a second output voltage (an example of a first low voltage) from the supplied high voltage. The smoothing capacitor 301 (an example of a capacitor) suppresses the fluctuations in the high voltage. The control device 305 (an example of a first device) is a device that operates by using the second output voltage as an electric power source and that increases the current consumption of the control device 305 when the supply of the high voltage to the DC-DC power source 306 is stopped.

By doing so, the current consumption of the control device 305 increases, and the current consumption of the DC-DC power source 306 also increases accordingly. When the supply of the high voltage to the DC-DC power source 306 is stopped, the current consumption of the DC-DC power source 306 is generated by the electric charge accumulated in the smoothing capacitor 301. Therefore, when the supply of the high voltage to the DC-DC power source 306 is stopped, the electric charge that is accumulated in the smoothing capacitor 301 can be discharged at a high speed by increasing the current consumption of the control device 305. That is, when the high voltage electric charge is accumulated in the capacitor and a discharge passage of the electric charge has disappeared, it is possible to quickly discharge the electric charge.

In the process according to the embodiment of the present disclosure, the order of the process may be changed within a range in which an appropriate process is performed.

Each of a storage unit and a storage device (including a register and a latch) in the embodiment of the present disclosure may be provided anywhere within a range in which appropriate information is transmitted and received. Further, each of the storage unit and the storage device may exist in a plurality of areas within a range in which appropriate information is transmitted and received and may store the data in a distributed manner.

Although the embodiment of the present disclosure has been described, the vehicle 1, the discharge determination device 20, the in-vehicle air conditioning system 30, the control device 305, and other control devices may have a computer system inside. The procedures of the above-mentioned processes are stored in a computer-readable recording medium in a form of a program, and the above-mentioned processes are performed by the computer reading and executing this program. A specific example of the computer is shown below.

Figure 4:
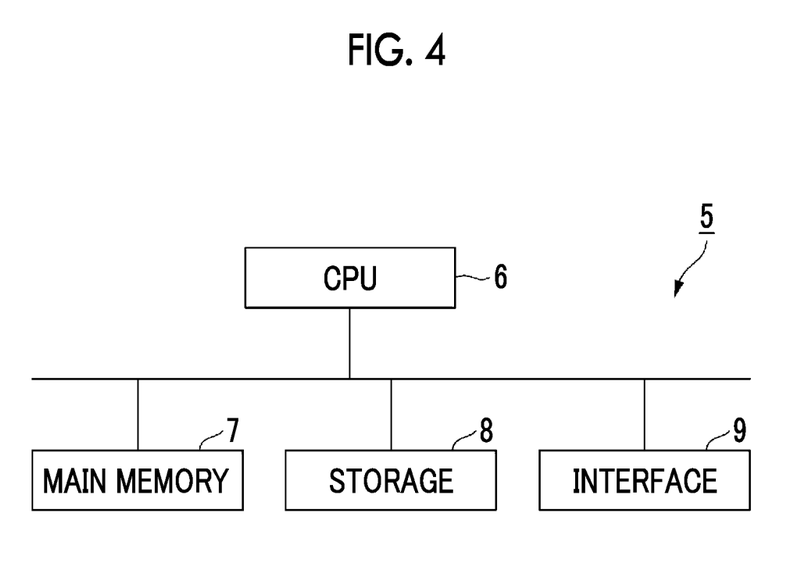
FIG. 4 is a schematic block diagram showing a configuration of a computer according to at least one embodiment.

FIG. 4 is a schematic block diagram showing a configuration of a computer according to at least one embodiment.

As shown in FIG. 4, the computer 5 includes a CPU 6, a main memory 7, a storage 8, and an interface 9.

For example, each of the above-mentioned vehicle 1, the discharge determination device 20, the in-vehicle air conditioning system 30, the control device 305, and other control devices is mounted on the computer 5. An operation of each processing unit described above is stored in the storage 8 in the form of a program. The CPU 6 reads the program from the storage 8, loads the program into the main memory 7, and executes the above process according to the program. Further, the CPU 6 secures a storage area corresponding to each of the above-mentioned storage units in the main memory 7 according to the program.

Examples of the storage 8 include a hard disk drive (HDD), a solid state drive (SSD), a magnetic disk, an optical magnetic disk, a compact disc read only memory (CD-ROM), a digital versatile disc read only memory (DVD-ROM), a semiconductor memory, and the like. The storage 8 may be an internal medium directly connected to a bus in the computer 5 or may be an external medium connected to the computer 5 via an interface 9 or via a communication line. Further, when this program is distributed to the computer 5 by using the communication line, the computer 5, in which the program is distributed, may load the program in the main memory 7 and execute the above process. In at least one embodiment, the storage 8 is a non-temporary tangible storage medium.

Further, the above program may implement some of the above-mentioned functions. Further, the program may be a file, a so-called difference file (difference program), that can implement the above-mentioned functions in combination with a program already recorded in a computer system.

Although some embodiments of the present disclosure have been described, these embodiments are examples and do not limit the scope of the invention. These embodiments may be subject to various additions, various omissions, various replacements, and various modifications without departing from the gist of the invention.

ADDITIONAL NOTES

The system (30), the vehicle (1), the discharge method, and the program described in each embodiment of the present disclosure are recognized as follows, for example.

(1) A system (30) according to a first aspect includes: a power source (306) that generates a first low voltage from a supplied high voltage; a capacitor (301) that suppresses fluctuations in the high voltage; and a first device (305) that operates by using the first low voltage as an electric power source and that increases current consumption of the first device when supply of the high voltage to the power source (306) is stopped.

The current consumption of the first device (305) increases, and the current consumption of the power source (306) also increases accordingly. When the supply of the high voltage to the power source (306) is stopped, the current consumption of the power source (306) is generated by an electric charge accumulated in the capacitor (301). Therefore, when the supply of the high voltage to the power source (306) is stopped, the electric charge that is accumulated in the capacitor (301) can be discharged at a high speed by increasing the current consumption of the first device (305). That is, with this system (30), when the high voltage electric charge is accumulated in the capacitor (301) and the discharge passage of the electric charge has disappeared, it is possible to quickly discharge the electric charge.

(2) The system (30) according to a second aspect may be the system (30) of (1) and may include: a second device (304) that operates by using a second low voltage as an electric power source, in which the power source (306) may generate the second low voltage from the high voltage, the first device (305) may output a voltage, which is used for increasing current consumption of the second device (304), to the second device (304) when the supply of the high voltage to the power source (306) is stopped, and the second device (304) may increase the current consumption of the second device (304) based on the voltage output from the first device (305).

With this system (30), the first device (305) can increase the current consumption, and the second device (304) can also increase the current consumption. Therefore, the system (30) according to the second aspect can discharge the electric charge of the capacitor (301) at a higher speed than the system (30) according to the first aspect.

(3) The system (30) according to a third aspect may be the system (30) of (2) and may include: a motor (302); and an inverter (303) that controls the motor (302) based on a voltage received from the second device (304).

With this system (30), even in the system (30) that drives the motor, when the high voltage electric charge is accumulated in the capacitor (301) and the discharge passage of the electric charge has disappeared, it is possible to quickly discharge the electric charge.

(4) The system (30) according to a fourth aspect may be the system (30) of (3), in which when the supply of the high voltage to the power source (306) is stopped, the second device (304) may set switching elements (303d, 303e, 303f) provided on a high voltage side of switching elements (303a, 303b, 303c, 303d, 303e, 303f) constituting the inverter (303) to an OFF state and cause only switching elements (303a, 303b, 303c) provided on a low voltage side of the switching elements (303a, 303b, 303c, 303d, 303e, 303f) to perform a switching operation, or may set the switching elements (303a, 303b, 303c) provided on the low voltage side of the switching elements (303a, 303b, 303c, 303d, 303e, 303f) constituting the inverter (303) to the OFF state and cause only the switching elements (303d, 303e, 303f) provided on the high voltage side of the switching elements (303a, 303b, 303c, 303d, 303e, 303f) to perform the switching operation.

With this system (30), even when the second device (304) increases the current consumption, the motor (302) is not rotated. Therefore, there is no adverse effect (for example, abnormal noise) associated with the rotation of the motor (302).

(5) A vehicle (1) according to a fifth aspect may include: the system (30) according to any one of (1) to (4); a battery (10) that outputs the high voltage; and a determination device (20) that determines whether or not the supply of the high voltage to the power source (306) is stopped, in which the first device (305) increases the current consumption of the first device (305) when the determination device (20) determines that the supply of the high voltage to the power source (306) is stopped.

With this vehicle (1), even in the system (30) provided in the vehicle (1), when the high voltage electric charge is accumulated in the capacitor (301) and the discharge passage of the electric charge has disappeared, it is possible to quickly discharge the electric charge.

(6) A discharge method according to a sixth aspect includes: causing a power source (306) to generate a first low voltage from a supplied high voltage; causing a capacitor (301) to suppress fluctuations in the high voltage; and causing a first device (305) to operate by using the first low voltage as an electric power source and to increase current consumption of the first device (305) when supply of the high voltage to the power source (306) is stopped.

With this discharge method, when the high voltage electric charge is accumulated in the capacitor (301) and the discharge passage of the electric charge has disappeared, it is possible to quickly discharge the electric charge.

(7) A program according to a seventh aspect for causing a computer (5), which has a system (30) including a power source (306) that generates a first low voltage from a supplied high voltage, a capacitor (301) that suppresses fluctuations in the high voltage, and a first device (305) that operates by using the first low voltage as an electric power source, to execute: increasing current consumption of the first device (305) when supply of the high voltage to the power source (306) is stopped.

With this program, when the high voltage electric charge is accumulated in the capacitor (301) and the discharge passage of the electric charge has disappeared, it is possible to quickly discharge the electric charge.

INDUSTRIAL APPLICABILITY

According to a system, a vehicle, a discharge method, and a program of an embodiment of the present disclosure, when a high voltage electric charge is accumulated in a capacitor and a discharge passage of the electric charge has disappeared, it is possible to quickly discharge the electric charge.

REFERENCE SIGNS LIST

1 Vehicle
5 Computer
6 CPU
7 Main memory
8 Storage
9 Interface
10 Battery
20 Discharge determination device
30 In-vehicle air conditioning system
301 Smoothing capacitor
302 Motor
303 Inverter
304 Drive device
305 Control device
306 DC-DC power source

The invention claimed is:
1. A system comprising:
 a power source that generates a first low voltage from a supplied high voltage;
 a capacitor that suppresses a fluctuation in the high voltage; and
 a first device that operates by using the first low voltage as an electric power source and that increases current consumption of the first device when supply of the high voltage to the power source is stopped.
2. The system according to claim 1, further comprising:
 a second device that operates by using a second low voltage as an electric power source, wherein
 the power source generates the second low voltage from the high voltage, the first device outputs a voltage, which is used for increasing current consumption of the second device, to the second device when the supply of the high voltage to the power source is stopped, and the second device increases the current consumption of the second device based on the voltage output from the first device.

3. The system according to claim 2, further comprising:
a motor; and
an inverter that controls the motor based on a voltage received from the second device.

4. The system according to claim 3, wherein
when the supply of the high voltage to the power source is stopped, the second device
sets a switching element provided on a high voltage side among switching elements constituting the inverter to an OFF state and causes only a switching element provided on a low voltage side among the switching elements to perform a switching operation, or
sets the switching element provided on the low voltage side among the switching elements constituting the inverter to the OFF state and causes only the switching element provided on the high voltage side among the switching elements to perform the switching operation.

5. A vehicle comprising:
the system according to claim 4;
a battery that outputs the high voltage; and
a determination device that determines whether or not the supply of the high voltage to the power source is stopped, wherein
the first device increases the current consumption of the first device when the determination device determines that the supply of the high voltage to the power source is stopped.

6. A vehicle comprising:
the system according to claim 3;
a battery that outputs the high voltage; and
a determination device that determines whether or not the supply of the high voltage to the power source is stopped, wherein
the first device increases the current consumption of the first device when the determination device determines that the supply of the high voltage to the power source is stopped.

7. A vehicle comprising:
the system according to claim 2;
a battery that outputs the high voltage; and
a determination device that determines whether or not the supply of the high voltage to the power source is stopped, wherein
the first device increases the current consumption of the first device when the determination device determines that the supply of the high voltage to the power source is stopped.

8. A vehicle comprising:
the system according to claim 1;
a battery that outputs the high voltage; and
a determination device that determines whether or not the supply of the high voltage to the power source is stopped, wherein
the first device increases the current consumption of the first device when the determination device determines that the supply of the high voltage to the power source is stopped.

9. A discharge method comprising:
causing a power source to generate a first low voltage from a supplied high voltage;
causing a capacitor to suppress a fluctuation in the high voltage; and
causing a first device to operate by using the first low voltage as an electric power source and to increase current consumption of the first device when supply of the high voltage to the power source is stopped.

10. A program stored on a non-transitory medium for causing a computer of a system including a power source that generates a first low voltage from a supplied high voltage, a capacitor that suppresses fluctuations in the high voltage, and a first device that operates by using the first low voltage as an electric power source, to execute: increasing current consumption of the first device when supply of the high voltage to the power source is stopped.

* * * * *